(12) United States Patent
Sankaran et al.

(10) Patent No.: US 10,019,736 B2
(45) Date of Patent: Jul. 10, 2018

(54) SYSTEMS AND METHODS FOR IDENTIFYING HOUSEHOLD USERS OF ELECTRONIC SCREEN DEVICES

(71) Applicant: YuMe Inc., Redwood City, CA (US)

(72) Inventors: Ayyappan Sankaran, San Jose, CA (US); Sachin Gupta, Fremont, CA (US); Vijay Kaushik, Fremont, CA (US); Ayusman Sarangi, Mountain View, CA (US)

(73) Assignee: YuMe, Inc., Redwood City, CA (US)

( * ) Notice: Subject to any disclaimer, the term of this patent is extended or adjusted under 35 U.S.C. 154(b) by 0 days.

(21) Appl. No.: 15/031,675

(22) PCT Filed: Nov. 6, 2014

(86) PCT No.: PCT/US2014/064442
§ 371 (c)(1),
(2) Date: Apr. 22, 2016

(87) PCT Pub. No.: WO2015/169957
PCT Pub. Date: May 14, 2015

(65) Prior Publication Data
US 2016/0275563 A1      Sep. 22, 2016

Related U.S. Application Data

(60) Provisional application No. 61/900,951, filed on Nov. 6, 2013, provisional application No. 61/900,955, filed on Nov. 6, 2013.

(51) Int. Cl.
*G06Q 30/02* (2012.01)
*H04L 29/08* (2006.01)

(52) U.S. Cl.
CPC ......... *G06Q 30/0269* (2013.01); *G06Q 30/02* (2013.01); *G06Q 30/0277* (2013.01); *H04L 67/22* (2013.01)

(58) Field of Classification Search
CPC ............... G06Q 30/0269; G06Q 30/02; G06Q 30/0277; H04L 67/22
USPC .......................................................... 725/34
See application file for complete search history.

(56) References Cited

U.S. PATENT DOCUMENTS

| | | | | |
|---|---|---|---|---|
| 9,292,606 | B1 * | 3/2016 | Kingman, Jr. | G06Q 30/0251 |
| 2005/0038702 | A1 * | 2/2005 | Merriman | G06Q 30/02 705/14.53 |
| 2006/0101211 | A1 * | 5/2006 | Baldwin | G06F 11/006 711/154 |
| 2009/0129377 | A1 * | 5/2009 | Chamberlain | G06Q 30/0201 370/389 |

(Continued)

*Primary Examiner* — Nathan Flynn
*Assistant Examiner* — Caroline Somera
(74) *Attorney, Agent, or Firm* — Dunlap Codding, P.C.

(57) ABSTRACT

A system and method for identifying household users of electronic screen devices includes a server system having a digital processor, non-transient computer readable media, and a database. The computer readable media includes program instructions executable on the digital processor for: (a) retrieving from the database a stored IP address and requestor attributes associated with an advertisement (ad) request of a requestor; (b) storing an ad request that is likely of a residential origin in an IP Bucket; and (c) assigning a household identifier (HID) to the IP Bucket if it qualifies as a household.

13 Claims, 6 Drawing Sheets

(56) References Cited

U.S. PATENT DOCUMENTS

| | | | | |
|---|---|---|---|---|
| 2011/0167440 A1* | 7/2011 | Greenfield | ............ | H04L 63/102 |
| | | | | 725/25 |
| 2012/0209717 A1* | 8/2012 | Henry | .................... | G06Q 30/02 |
| | | | | 705/14.64 |
| 2013/0311649 A1* | 11/2013 | Defrancesco | ........... | H04L 43/04 |
| | | | | 709/224 |
| 2014/0046777 A1* | 2/2014 | Markey | .............. | G06Q 30/0269 |
| | | | | 705/14.66 |
| 2014/0279046 A1* | 9/2014 | Sanada | .................. | G06Q 50/01 |
| | | | | 705/14.66 |
| 2014/0282655 A1* | 9/2014 | Roberts | .............. | G06Q 30/0255 |
| | | | | 725/14 |

* cited by examiner

SYSTEMS AND METHODS FOR IDENTIFYING HOUSEHOLD USERS OF ELECTRONIC SCREEN DEVICES

FIELD

This invention relates systems for electronic delivery of content and, more particularly, to systems for targeting the delivery of streaming video.

BACKGROUND

In today's connected world of devices, most of consumers' media time is spent in front of four video screens, namely their computer, smartphone, tablet and television screens. As used herein, the term "screen" may be used synonymously with a "user device" and "terminal." The screens users want to use depend upon the context of where they are located (workplace, home, travelling, etc.), what we they want to achieve (shop, make travel plans, watch video, etc.) and how long will it take to achieve their desired results.

Google in *The New Multi-screen World: Understanding Cross-platform Consumer Behavior*, dated August 2012, and hereafter referred to as *Google Multi-Screen*, calls this phenomenon as "*the new multi-screen world*" As explained in *Google Multi-Screen*, there are at least two different modes of consumer's behavior in context of multi-screen usage, namely: 1) sequential screening as a user moves between screens; and 2) Simultaneous screening where we use multiple screens at the same time.

On average, individuals spend 4.4 hours of leisure time in front of the four screens every day, constituting 90% of all media interactions, where the remaining 10% of media interactions include traditional radio, newspaper and magazine interactions, which are non-screen based. The number of connected devices with screens is rapidly increasing with the growth of connected TVs, tablets and smartphones. In US, the average number of connected devices per household is 5.2.

The resulting new cross-screen digital consumer experience has direct implications with respect to advertising. Brand and performance advertisers follow where their consumers are and, in today's world, they are on all four screens. Furthermore, they are switching screens as they move along a "sales funnel" for their products, making it even more important to follow their consumers across the screens. For example, shopping and trip planning can start on a tablet and finish on a desktop. Also TV, which used to command undivided attention and a perfect vehicle for brand advertising, is not getting the full attention of its viewers. It is often watched along with a companion screen (e.g. a smartphone or tablet), diluting the effectiveness of brand message of a video commercial displayed on TV. The media fragmentation across screens and multiple screen usage to accomplish a purchase decision brings up new opportunities for brand advertisers to reach audiences with the right messages at the right times.

The multiscreen phenomenon is also a household phenomenon. As noted above, the average household has over five connected devices ("screens") including Smart TV's, computers, smart phones, tablets, etc. By "household" it is generally meant a residential household including at least one, but often several, resident(s), although the term "household" can sometimes refer to other social groups, e.g. businesses or organizations which can include multiple screens and multiple members. Each "household" will have certain attributes which can be targeted for the more effective implementations of advertising campaigns. Therefore, it would be desirable to determine which user devices, of the many millions of connected user devices in use, are associated with a particular household.

Network terminals (e.g. personal computers, laptops, etc.) provided with traditional network browsers (e.g. Google Chrome, Internet Explorer, Firefox, Safari etc.) are types of connected devices that may have the functionality of providing a "cookie" which tracks browsing activities, personal data, preferences, etc. of a user. For example, cookies have been used to provide relevant advertisements to users of network terminals and could potentially be used to determine personal and/or group demographics. However, users have become increasing wary of cookies, primarily due to privacy issues, and increasing disable the cookie function in their browsers or use cookie-blocking services. Also, some providers of browser software, responding to user demand, are starting to block cookies to varying degrees. For example, Safari has a default setting which blocks all third party cookies. Also, many cookies have an expiration date and many network terminals have applications with network browsing capabilities (e.g. apps in smartphones, tablets, etc.) that don't have cookies. As a result, user cookies are often not available to service providers such as, for example, advertisers so that they can customize the delivery of advertisements to a user.

SUMMARY

Various examples are set forth herein for the purpose of illustrating various combinations of elements and acts within the scope of the disclosures of the specification and drawings. As will be apparent to those of skill in the art, other combinations of elements and acts, and variations thereof, are also supported herein.

In an embodiment, set forth by way of example and not limitation, a network system supports a household user identification process which analyzes ad requests from user devices and assigns a Household ID (HID) to a user device, as appropriate. In one example embodiment, a home IP address (HIP) is used as a starting point to determine if user devices and/or persons that use that HIP are part of a household. If it is determined that they are part of the household, a HID is assigned and the user devices are mapped to the HIP.

In an embodiment, set forth by example and not limitation, an advertising network determines if a user device making an ad request is associated with a HID. If so, the advertising network could use characteristics associated with the HID to determine an optimal advertisement ("ad") to return to the user device.

In an embodiment, set forth by way of example and not limitation, a publisher network can benefit by knowing how many households its inventory reaches as well as demographics concerning those households. This allows publishers, for example, to determine the effectiveness of marketing to households with different content, geographical locations, household make-up, etc.

In an embodiment, set forth by way of example and not limitation, a system for servicing ad requests includes a server system having a digital processor, non-transient computer readable media, and a network interface. In this example embodiment, the computer readable media includes program instructions executable on the digital processor for: receiving an advertisement (ad) request via the network interface from a requestor having an Internet Protocol (IP)

address and requestor attributes; storing the IP address and requestor attributes of the requestor in a database; determining if there is a household identifier (HID) associated with the stored IP address and requestor attributes; servicing the ad request using the HID information if it was determined that there was an HID associated with the stored IP address for the requestor in the database; and servicing the ad request using available information if it was determined that there was not an HID associated with the stored IP address for the requestor in the database.

In an embodiment, set forth by way of example and not limitation, a system for identifying household users of electronic screen devices includes a server system having a digital processor, non-transient computer readable media, and a database. In this example embodiment, the computer readable media includes program instructions executable on the digital processor for: (a) retrieving from the database a stored IP address and requestor attributes associated with an advertisement (ad) request of a requestor; (b) storing an ad request that is likely of a residential origin in a memory bucket; and (c) assigning a household identifier (HID) to the memory bucket if it qualifies as a household.

In an embodiment, set forth by way of example and not limitation, a method for servicing ad requests using household identification includes: developing a database correlating a plurality of Internet Protocol (IP) addresses and a plurality of requestor attributes with at least one household identifier (HID); receiving an advertisement (ad) request via the Internet from a requestor having an IP address and requestor attributes; matching the ad request with an HID in the database; and servicing the ad request using the HID information.

An advantage of identifying and targeting household members is to reach both decision makers and influencers of the household. For example, the purchase of a product or service through a CTV or smartphone may be implemented by one member of a household while one or other members directly or indirectly influences the decision. Interaction with identified household members through a number of screens allows both the decision makers and influencers to help increase brand awareness within the household and ultimately facilitates the purchasing decision.

These and other examples of combinations of elements and acts supported herein as well as advantages thereof will become apparent to those of skill in the art upon a reading of the following descriptions and a study of the several figures of the drawing.

BRIEF DESCRIPTION OF DRAWINGS

Several examples will now be described with reference to the drawings, wherein like elements and/or acts are provided with like reference numerals. The examples are intended to illustrate, not limit, concepts disclosed herein. The drawings include the following figures.

DESCRIPTION OF EMBODIMENTS

Figure 1:
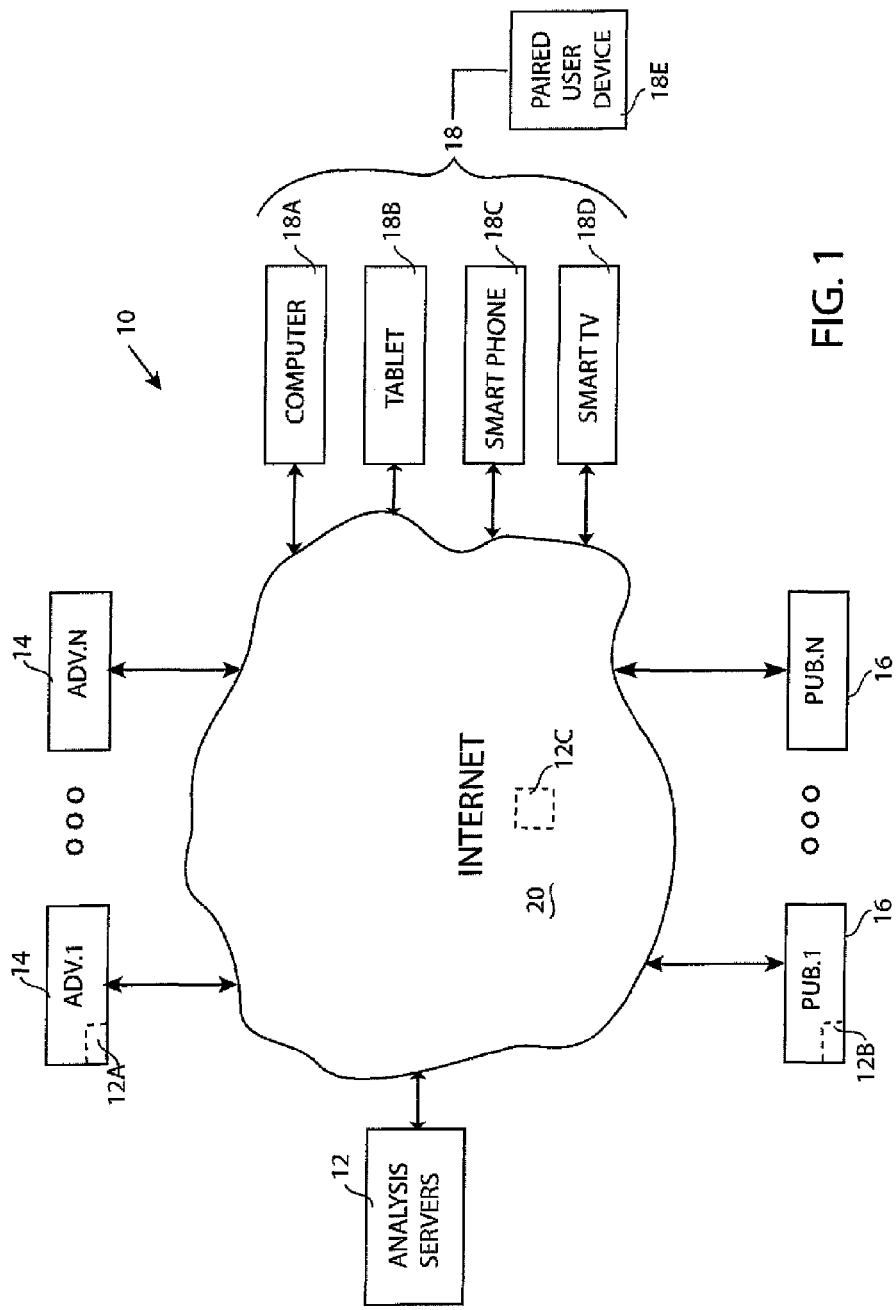
FIG. 1 illustrates an example network system supporting a household user identification process.

FIG. 1 illustrates a network system 10 supporting a household user identification process in accordance with a non-limiting example. In this example, the network system 10 includes one or more analysis servers 12, one or more advertiser servers 14 and one or more publisher servers 16. The system at 10 may further include other computers, servers or computerized systems such as user devices 18. In this example, the analysis servers 12, advertiser servers 14, publisher servers 16, and user devices 18 can communicate by a wide area network such as the Internet 20 (also known as a "global network" or a "wide area network" or "WAN" operating with TCP/IP packet protocols).

The analysis servers 12 can be implemented as a single server or as a number of servers, such as a server farm and/or virtual servers, as will be appreciated by those of skill in the art. Alternatively, the functionality of the analysis servers 12 may be implemented elsewhere in the network system 10 such as on an advertiser server 14, as indicated at 12A, on the publisher server 16, as indicated at 12B, or as part as cloud computing as indicated at 12C, all being non-limiting examples. As will be appreciated by those of skill in the art, the processes of analysis servers 12 may be distributed within network system 10.

In the example of FIG. 1, the network system 10 includes a plurality of advertiser servers 14 {ADV. 1, ADV. 2, . . . , ADV. N}. ADV. 1 can be, for example, a manufacturer of soft drinks, ADV. 2 can be a computer manufacturer and ADV. N can be, for example, an accounting firm. Alternatively, an advertiser can be an advertising agency acting as a middleman in the purchase of advertising for a client, can be an advertising ("ad") network, or be an ad exchange. While each of the advertiser servers 14 may be implemented as a single computer, such as a network server, they can also represent other computer configurations, such as a computing cluster on a local area network (LAN).

It should further be noted that, in some instances, an ad network is, essentially, transparent to advertisers, publishers or both. That is, an ad network may be considered to be a publisher or collection of publishers to an advertiser and/or an ad network may be considered to be an advertiser or collection of advertisers to a publisher.

The publisher servers 16 can each represent one or more servers, such as a server farm. In the example of FIG. 1, the network system 10 includes a plurality of publisher servers 16 {PUB. 1, PUB. 2, . . . , PUB. M}. For example, PUB. 1 can be an Internet portal, PUB. 2 can be a search engine, and PUB. M can be a news website. As noted previously, one or more of the publisher servers 16 can implement some or all of the functionality of analysis servers 12.

It should be noted that the selection of publishers can be enhanced by categorizing the publishers by, for example, content. That is, a "publisher" can be a single legal entity, or a subset of that entity, or a part of a group of entities, by way of several non-limiting examples. For example, a publisher entity may have 1000 publications of which 100 are directed to dramatic content, 100 are directed to comedy, etc. The subset of publications of the publisher entity having a common thematic content may be considered a "publisher."

Furthermore, "publishers" may include a group of publications provided by different agencies which conform to a theme such as, by way of non-limiting examples, drama, sports or entertainment.

User devices 18 can be any type of terminal, screen or device including, by way of non-limiting examples, a computer 18A, a connected TV (a/k/a Smart TV or CTV) 18D, a tablet 18B and a smartphone 18C. The distinguishing characteristics of user devices 18 include connectivity to the Internet 20 (either directly or indirectly, e.g. by pairing) and display screens which can display, for example, advertisements delivered to the user devices over the Internet. For example, a user device 18E may be paired (e.g. with a wireless Bluetooth connection) with a connected user device 18. User devices 18E that are paired (even once) can provide additional household information with respect to the other household user devices.

Figure 2:
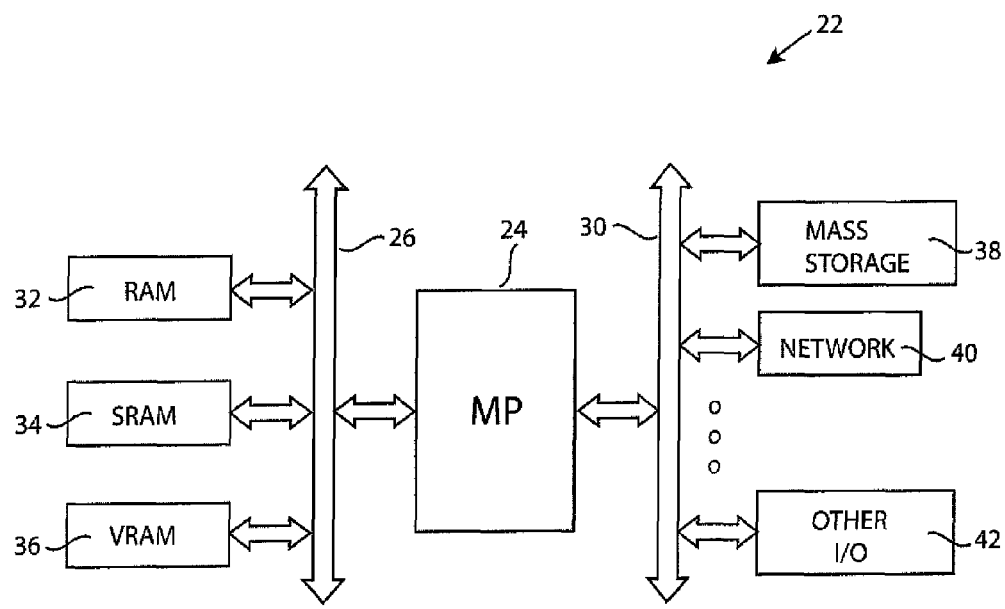
FIG. 2 is a block diagram of an example computer, computerized device, proxy and/or server which may form a part of the system of FIG. 1.

FIG. 2 is a simplified block diagram of a computer and/or server 22 suitable for use in network system 10. By way of non-limiting example, computer 22 includes a microprocessor 24 coupled to a memory bus 26 and an input/output (I/O) bus 30. A number of memory and/or other high speed devices may be coupled to memory bus 26 such as the RAM 32, SRAM 34 and VRAM 36. Attached to the I/O bus 30 are various I/O devices such as mass storage 38, network interface 40, and other I/O 42. As will be appreciated by those of skill in the art, there are a number of computer readable media available to the microprocessor 24 such as the RAM 32, SRAM 34, VRAM 36 and mass storage 38. The network interface 40 and other I/O 42 also may include computer readable media such as registers, caches, buffers, etc. Mass storage 38 can be of various types including hard disk drives, optical drives and flash drives, to name a few.

Figure 3:
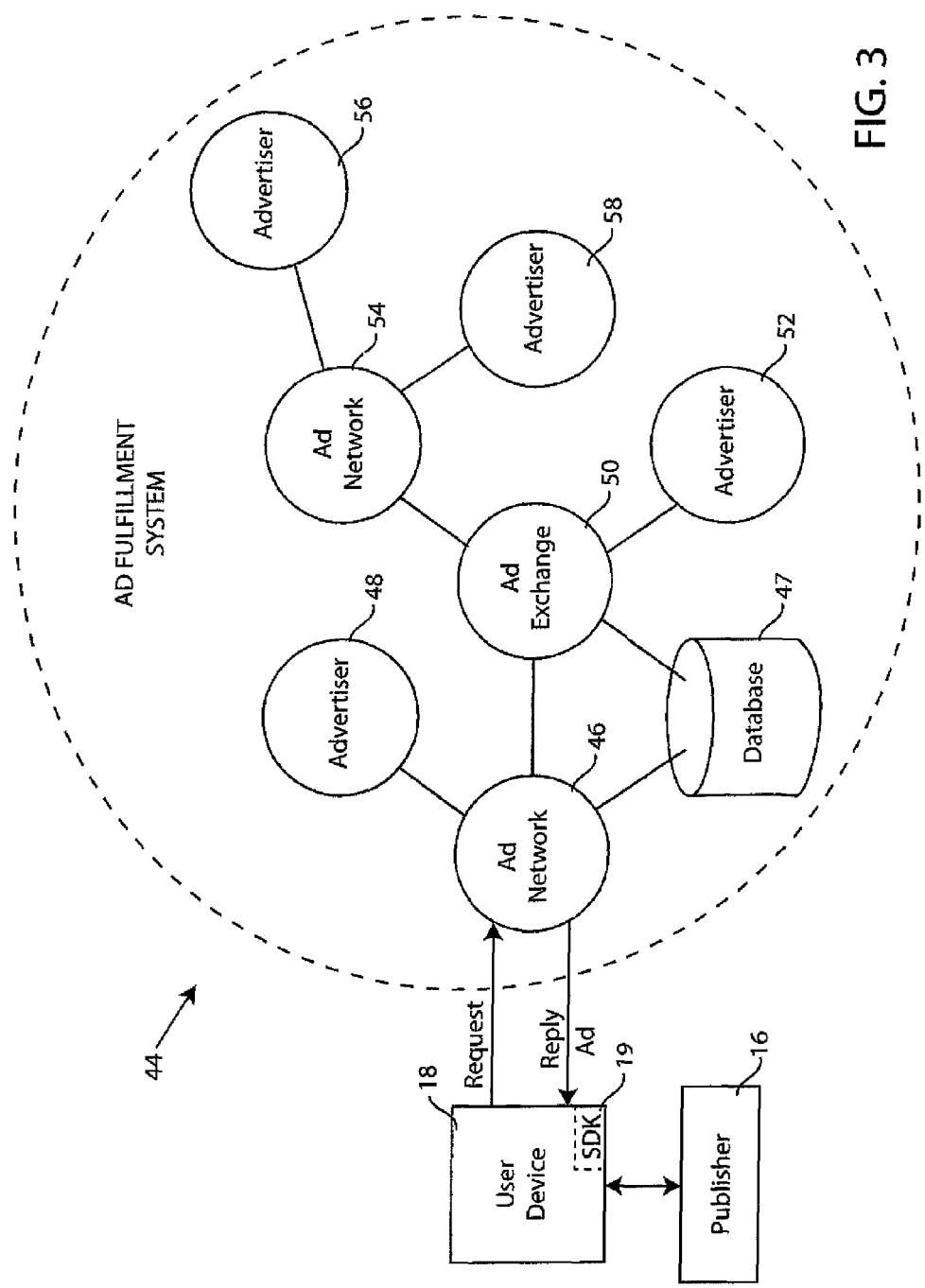
FIG. 3 is a block diagram of an example ad fulfillment system.

FIG. 3 illustrates, by way of example and not limitation, a User Device 18, a Publisher 16, and an Ad Fulfillment System 44. The User Device 18 is a "connected" device in that it communicates with the Publisher 16 and the Ad Fulfillment System 44 via the Internet. In this non-limiting example, user device 18 sends a Request to an Ad Network 46 of Ad Fulfillment System 44. The Ad Network of this example is associated with a database 47. The Ad Network 46 will reply to the user device Request with a Reply (Ad). The Ad Network, in this example, is coupled to one or more Advertisers 48 and to one or more Ad Exchanges 50. The Ad Exchanges, in turn, can be coupled to one or more Advertisers 52, one or more Ad Networks 54, etc. It will be appreciated that the network of the Ad Fulfillment System 44 can include other computers, databases and servers, e.g. Advertisers 56 and 58 connected to the Ad Network 54. However, at some point latency becomes a issue in that the person using the user device will typically only wait for a short period of time for an advertisement before "clicking out" and moving on to another screen.

It will be appreciated that, in this non-limiting example, the Ad Network 46 is the gateway for the fulfillment of the ad request by the user device 18. The request to the Ad Network 46 can be accomplished, by way of example, with an optional ad network SDK (Software Development Kit) 19 embedded in the user device 18 player which allows the user device to send a request to the URL (Universal Resource Locator) of, in this example, Ad Network 46. The SDK can, for example, be embedded in a player provided to the user device 18 by Publisher 16. A Request will include, as a minimum, the IP address of User Device 18 so that the Ad Network 46 may send its Reply. However, the SDK may provide additional information concerning, by way of non-limiting example, the user, the user device, its environment and/or how it is being used ("Attributes") to the Ad Network 46 that can be useful in determining an appropriate Ad to be sent to the User Device 18.

When the user device 18 is a computer 18A, or another user device that can support a web browser, part of the Request can include what is known as a "cookie." A cookie is a relatively small file of information about a user device which may include demographics, personal information, browser history, context and other information or Attributes that can help with the ad selection process. However, cookies are being increasingly disabled and/or blocked for privacy purposes and they are not generally used on user devices (such as many mobile devices) by application programs ("apps") that don't implement a web browser. However, Attributes may be provided by user devices in other ways, such as by the apps themselves. Nonetheless, cookies can be useful in the determination of families.

Figure 4:
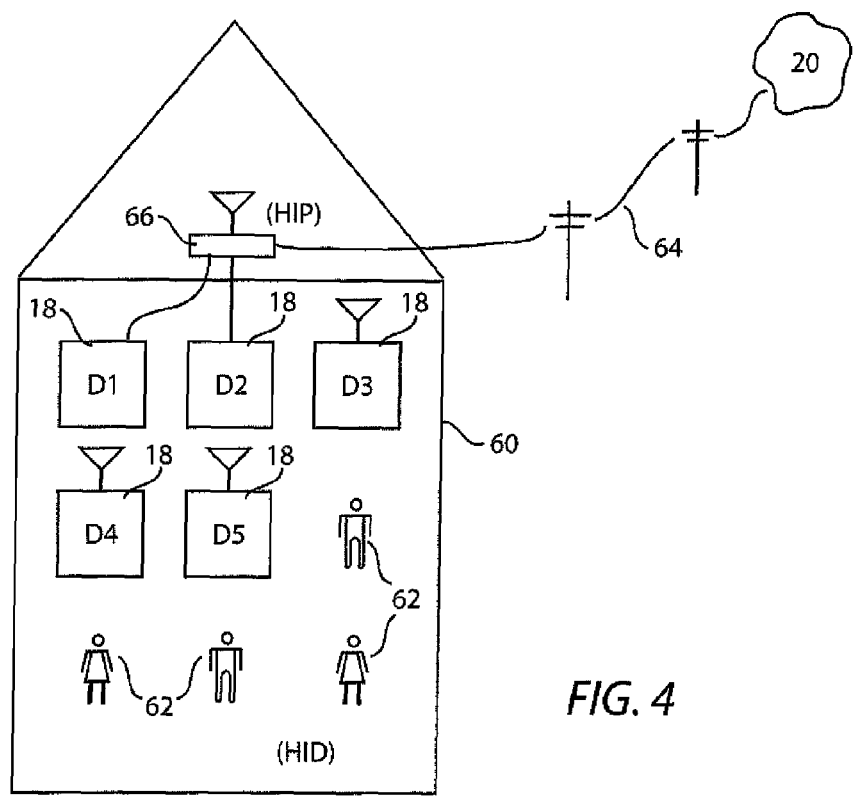
FIG. 4 illustrates an example household of user devices and persons.

In FIG. 4, a Household 60 is illustrated. By "household" it is generally meant a residential household including at least one, but often several, resident(s), although the term "household" can sometimes refer to other social groups, e.g. businesses or organizations which can include multiple screens, multiple members and sometimes multiple locations. Each "household" will have certain attributes which can be targeted for the more effective implementations of advertising campaigns.

By "household" it is generally meant a residential household including at least one, but often several, resident(s), although the term "household" can sometimes refer to other social groups, e.g. businesses or organizations which can include multiple screens and multiple members. Therefore, a "household" is a group of people that are socially related in some fashion. While a household may become associated with one or more user devices, it should be noted that a household can become disassociated with certain devices and/or associated with other devices over time. Also, a household tends to be associated with one or more particular locations, but that can also change over time. This can be accomplished by assigning a Household ID (HID) to an identified household, which can be associated with user devices, places, etc. in a database that can be updated as appropriate.

In the non-limiting example of FIG. 4, the "household" refers to one or more persons 62 that are associated with a collection of devices 18 and a home residence. By way of non-limiting example, Household 60 can be connected to the Internet 20 by a transmission media 64 such as cable, fiber optic, twisted pair and wireless transmission media. In this example, the transmission media is coupled to a WiFi hub 66 having an associated IP (Internet Protocol) address HIP. As will be appreciated by those of skill in the art, the HIP address may change upon occasion, either due to a resetting by the ISP (Internet Service Provider) or by the household members. In such cases, the HID is updated to associate the user devices 18 and persons 62 associated with the new HIP.

In this non-limiting example, the WiFi hub 66 communicates through a wired (e.g. Ethernet) connection with devices D1 and D2 and wirelessly with user devices D3, D4 and D5. For example, device D1 can be a desktop computer, device D2 can be a CTV, device D3 can be a tablet computer, device D4 can be a laptop computer, and device D5 can be a smartphone. Since each of these user devices 18 are communicating with the WiFi hub 66, they will all have the same HIP when they are physically within (or nearby) the Household 60. As will be discussed subsequently, determining that the user devices D1-D5 and persons 62 are associated with the Household 60 allows a HID (Household ID) to be assigned to those devices and persons. The HID is a useful tool in providing appropriate ads to the user devices. Furthermore, the HID is transferrable if the household with which it is associated moves to a new home.

It will be appreciated from the foregoing that the HIP alone may be enough to identify a Household 60. This is because certain IP addresses are known to be associated exclusively with residential areas. However, in some instances, it may be uncertain whether an IP address is associated, in whole or in part, with a residential area. In such cases, it is desirable to confirm that the IP address is, in fact, associated with a home residence.

Figure 5:
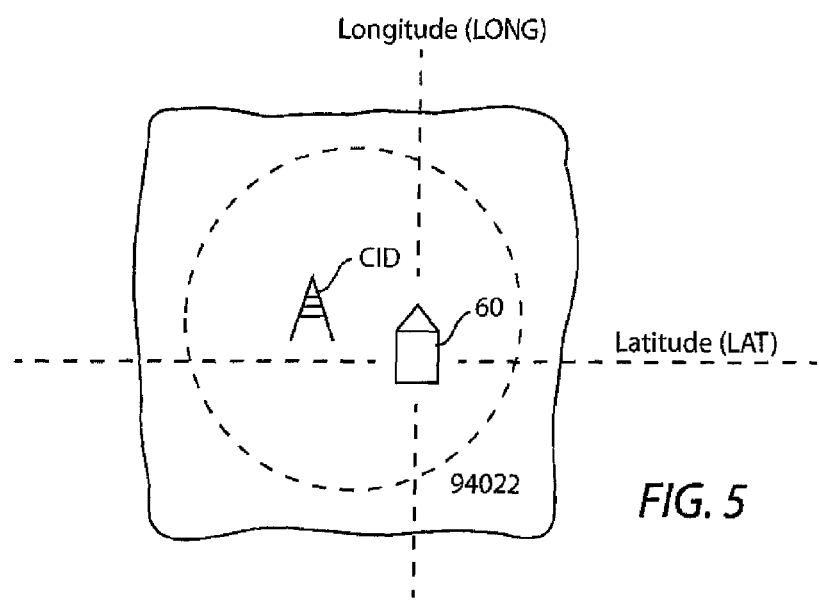
FIG. 5 illustrates example methods for determining whether an IP address is associated with a home residence.

As illustrated in FIG. 5, Household 60 may be located geographically by using certain attributes provided by the devices 18 when requesting an advertisement. For example, the attributes of latitude (LAT), longitude (LONG) and/or zip code ("94022" in this non-limiting example) may be provided as part of an ad request. Also, a cellular ("cell") tower ID ("CID") may be provided by as an Attribute if provided during an Ad Request. These and other Attributes can help geographically locate the Household 60 by using such tools as Google Maps, by way of non-limiting example.

Figure 6:
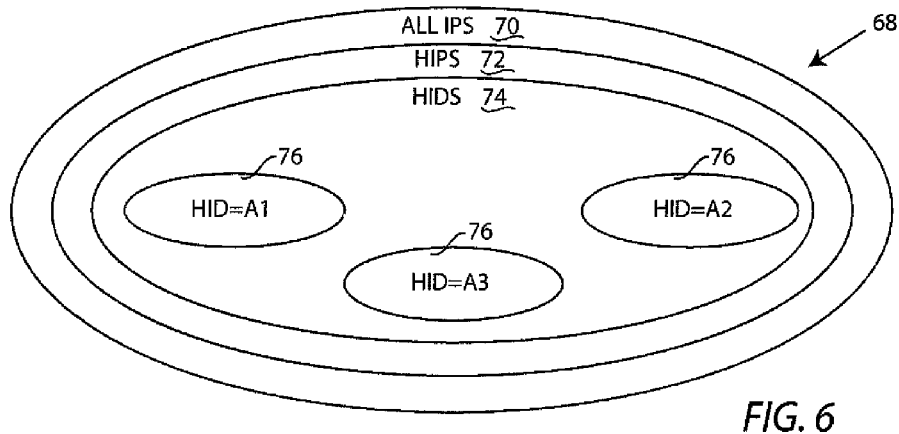
FIG. 6 illustrates an example hierarchy of identifications for user devices.

FIG. 6 illustrates a hierarchy of identifications for user devices. These identifications can be stored, by way of non-limiting example, in database 47 that is coupled to the Ad Network 46 (see FIG. 3). By way on non-limiting example, database 47 may include all unique IP addresses 70 known by the Ad Network 46. One level down are the HIPs 72 known by the Ad Network 46. At the next level down are the HIDs 74 (including one or more individual HID 76) known to the Ad Network 46 which map screens to the HIPs. For example, for HID=A1, a CTV, computer, tablet and smartphone may be mapped to a HIP, for HID=A2, a computer and a smartphone may be mapped to a HIP, and for HID=A3 a CTV may be mapped to a HIP. By accurately associating user devices with HID the Ad Network can make appropriate decisions as to which ads to serve to those devices.

Figure 7:
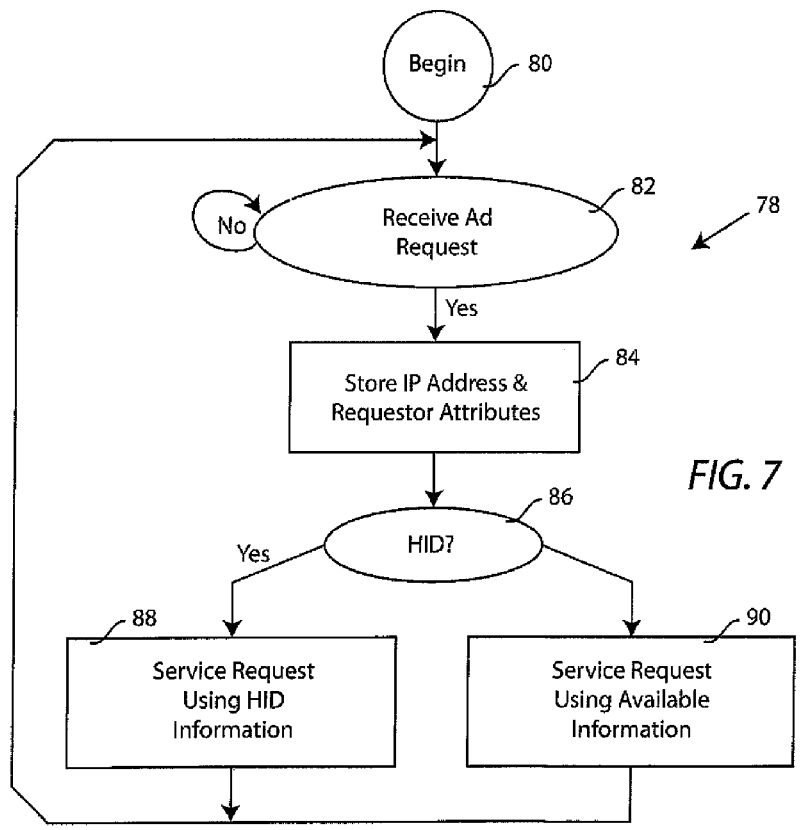
FIG. 7 illustrates an example process for servicing ad requests from user devices.

In FIG. 7, a process 78, set forth by way of example and not limitation, for servicing ad requests begins at 80 and, in an operation 82, it is determined if an Ad Request is received. With additional reference to FIG. 3, the Ad Request can be sent by User Device 18 to Ad Network 46, and the process 78 can execute on one or more computers of the Ad Network 46. If an Ad Request has been received, the IP address and any attributes associated with the Request are stored (e.g. in database 47), by an operation 84. Next, in an operation 86, it is determined if the User Device 18 is associated with an HID. This can be accomplished with a lookup table or the like of database 47. If it is determined that the User Device 18 is a member of a known household (e.g. it is associated with an HID), the Request is serviced with a Reply using the HID information in an operation 88. If operation 86 does not correlate the User Device 18 with a HID, the Request is serviced using available information in an operation 90. Process control then returns to operation 82 to await a new Ad Request.

Figure 8:
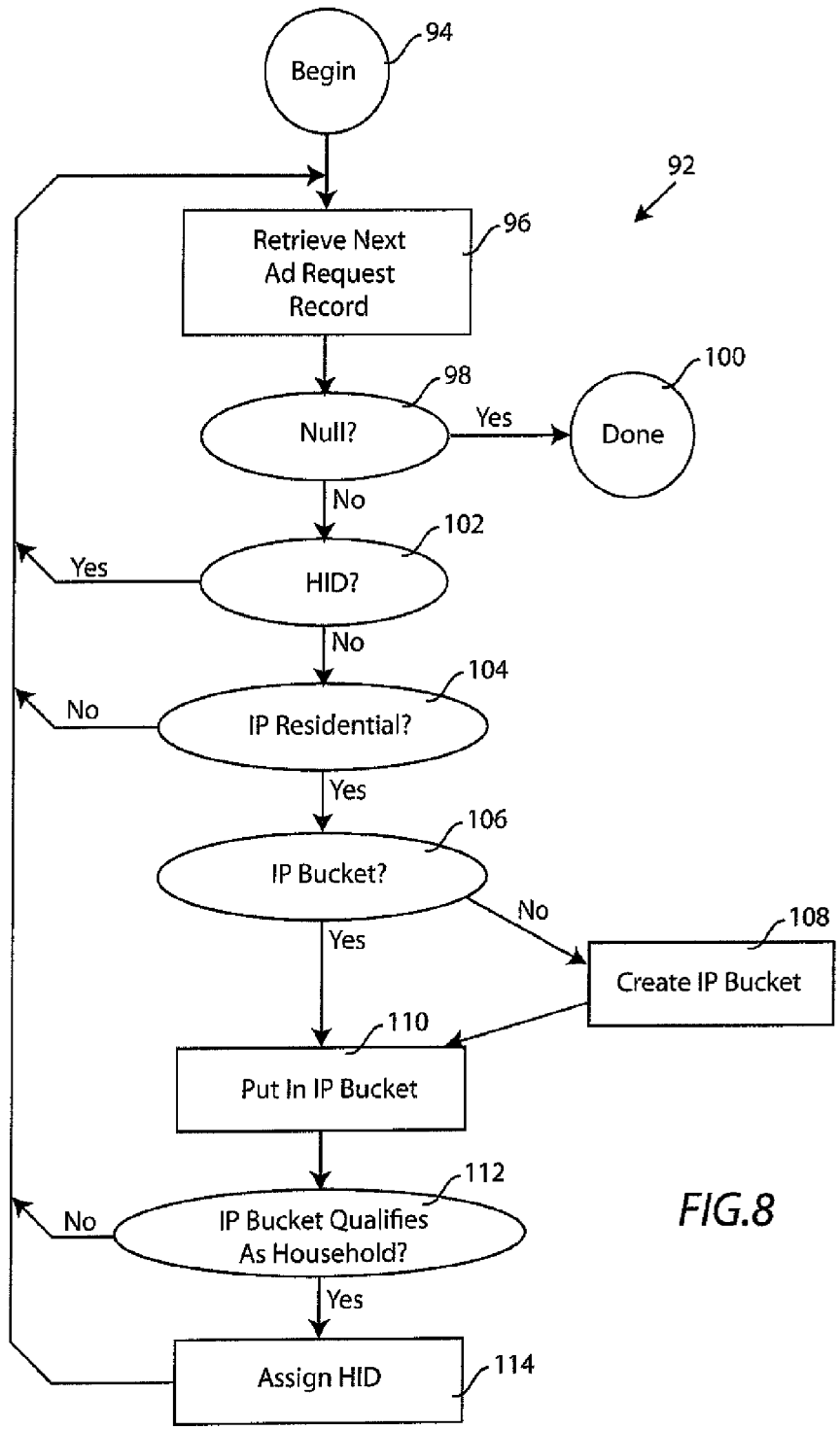
FIG. 8 illustrates an example process for identifying households.

In FIG. 8 a process 92, set forth by way of example and not limitation, for identifying households begins at 94 and, in an operation 96, an Ad Request record is retrieved. With additional reference to FIGS. 3 and 7, when an Ad Request is received it can be stored, by way of non-limiting example, in a database 47 as a record for the purpose of later analysis. In this non-limiting example, the analysis is for the purpose of determining HIDs associated with a User Device 18 and, perhaps, profiles of users of User Device 18.

Process 92 continues with an operation 98 which determines if the end of the database of Ad Requests has been reached. If so, process 92 is completed at 100. If not, then an operation 102 determines if the HID is already known for this User Device 18. If so, process control returns to operation 96. If an HID is not known for the User Device 18, it is determined in an operation 104 whether the IP address is associated with a home residence ("household") using, for example, one or more techniques as described with respect to FIG. 5. If it appears from operation 104 that the IP address of the User Device 18 is associated with a home residence, it is determined if an "IP Bucket" has already been created for that IP address in an operation 106. If not, an IP Bucket is created by operation 108 and, in an operation 110 the User Device 18 is added to the IP Bucket.

In an operation 112, it is determined if an IP Bucket qualifies as a household. By way of non-limiting example, it may be determined if there are five or more user devices in the IP Bucket that it qualifies as a household, since the average household has more than five connected devices. Other qualification criteria can also apply, as will be apparent to those of skill in the art. If the IP Bucket does qualify as a household, an HID is assigned and is associated with the user devices (a/k/a screens or terminals) in the bucket.

It will be appreciated that the identification of households and household members provides information leading to the improved delivery of effective advertising to household screens. For example, identifying characteristics of various household members based upon multiple signal points (e.g. multiple screens) can be advantageous. Also, the identification of households and household members provides clues to common household attributes and behaviors. For example, if one screen device in a household shows the attribute of being a pet lover, auto enthusiast and/or bowling enthusiast, these attributes and behaviors can be imputed to other household members by way of association.

It will be further appreciated that the various processes described herein, including the processes illustrated by way of example in FIGS. 7 and 8, can be implemented on computers and/or servers at many places within the network system 10. For example, the process 78 of FIG. 7 can be implemented by the Ad network 46 and the process 92 of FIG. 8 can be implemented an analysis server 12. Furthermore, the database 47 may be shared or distributed.

In an embodiment, set forth by way of example and not limitation, each network terminal 18 can provide terminal information which forms the basis of a "fingerprint" for that terminal. These terminal fingerprints can be useful in the identification of network terminals associated with an HID and, potentially and identification of family members. The generation of fingerprints can be facilitated by the use of SDKs.

For example, YuMe, Inc. of Redwood City, Calif. embeds the customized software SDK 59 into user devices such as CTVs, smartphones, tablets and personal computers (PCs) which can provide a variety of information to, for example, their analysis servers 12 or advertisers 14. SDKs can be used to collect valuable real-time, continuous, network terminal information ("data") that can be saved and aggregated into a central decision-making engine. By way of non-limiting examples, information that can be derived from a terminal device 18 for the purpose of fingerprinting can include the size of the screen, fonts, the time zone, GPS, operating system versions, what plugins are available, what application the user is currently in, and other features or information that can, for example, be provided to an advertiser 14 as part of an advertisement ("ad") request.

By way of further non-limiting example, a network terminal 18 can be defined as a screen user device which has had installed upon it a unique SDK 59 which communicates with a server, such as an analysis server 12 or an advertiser server 14. By using information sent by the SDK for a network terminal 18 a terminal "fingerprint" can be developed using, for example, configuration settings and other observable characteristics by the SDK. Terminal fingerprinting allows for the identification or re-identification of a visiting terminal for such purposes as authenticating a terminal, to identify a user, to track and correlate a user's activity within and across sessions, and to collect information from which inferences can be drawn about a user.

In an embodiment, set forth by way of example but not limitation, a "terminal fingerprint" can include a homogeneous set of fields that describe a specific user device at a specific point in time. In this example, the fields can be collected via a variety of mechanism. In certain embodiments, missing fields can be considered part of the fingerprint.

It will be appreciated that a fingerprint of a given network terminal may change over time due to changes in software versions, browser plugins, network configurations etc. To address this fact, prior versions ("historical set") of a network terminal's fingerprint may be stored in a database. In a non-limiting example, a new fingerprint preferably matches the most recent fingerprint of the historical set within a certain threshold.

As used herein, a "terminal ID" is preferably a unique, algorithmically generated identification ("ID") that is assigned to the historical set of terminal fingerprints for a given terminal. A "match probability" reflects the probability that two fingerprints are from the same network terminal. The match probability can be normalized between the values of 0 and 1, for example, such that two fingerprints are more similar when the probability is closer to 1 and more dissimilar when the probability is closer to 0. A "match threshold" can be defined as the threshold of the match probability above which a fingerprint is considered to be from the same network terminal. If, for example, multiple fingerprints have a match probability above the threshold then the one with the highest score can be considered to be a match.

Although various examples have been described using specific terms and devices, such description is for illustrative purposes only. The words used are words of description rather than of limitation. It is to be understood that changes and variations may be made by those of ordinary skill in the art without departing from the spirit or the scope of any examples described herein. In addition, it should be understood that aspects of various other examples may be interchanged either in whole or in part. It is therefore intended that the claims be interpreted in accordance with the true spirit and scope of the invention without limitation or estoppel.

What is claimed is:

1. A system for servicing ad requests including those from a connected user device associated with a household comprising:
a server system including a digital processor, non-transient computer readable media, and a network interface, the computer readable media including program instructions executable on the digital processor for:
receiving an advertisement (ad) request via the network interface from a requestor having an Internet Protocol (IP) address and requestor attributes, wherein the requestor is a user of a connected user device including code segments of a Software Development Kit (SDK) associated with an advertising network;
storing the IP address and requestor attributes of the requestor in a database;
determining if there is a household identifier (HID) associated with the stored IP address and requestor attributes of the connected user device, wherein the connected user device is one of at least five connected user devices associated with the stored IP address associated with the HID, and wherein the stored IP address is an IP address of a household WiFi hub;
servicing the ad request using the HID information if it was determined that there was an HID associated with the stored IP address for the requestor in the database; and
servicing the ad request using available information if it was determined that there was not an HID associated with the stored IP address for the requestor in the database.

2. A system for servicing ad requests as recited in claim 1 wherein the server system comprises one or more servers connected to the Internet.

3. A system for servicing ad requests as recited in claim 1 wherein the connected user device is one of a CTV, smartphone, tablet and personal computer (PC).

4. A system for identifying household users of electronic screen devices comprising:
a server system including a digital processor, non-transient computer readable media, and a database, the computer readable media including program instructions executable on the digital processor for:
(a) retrieving from the database a stored IP address and requestor attributes associated with an advertisement (ad) request of a requestor, wherein the requestor is a user of a connected user device including code segments of a Software Development Kit (SDK) associated with an advertising network;
(b) storing an ad request that is likely of a residential origin in an IP Bucket by determining that the stored IP address is an IP address of a household WiFi hub; and
(c) assigning a household identifier (HID) to the IP Bucket if it qualifies as a household by containing at least five connected user devices associated with the stored IP address.

5. A system for identifying household users of electronic screen devices as recited in claim 4 wherein operations (a)-(c) are repeated for all stored IP addresses and requester attributes associated with the ad request.

6. A system for identifying household users of electronic screen devices as recited in claim 5 wherein operation (a) is repeated if there is already an HID associated with the ad request.

7. A system for identifying household users of electronic screen devices as recited in claim 6 wherein operation (a) is repeated if the IP address is determined not to be associated with a home residence.

8. A system for identifying household users of electronic screen devices as recited in claim 7 wherein an IP Bucket is created if there is not already an IP Bucket.

9. A method for servicing ad requests using household identification comprising:
developing a database correlating at least five connected devices associated with a stored IP address of a household WiFi hub with a household identifier (HID);
receiving an advertisement (ad) request via the Internet from a requestor having an IP address and requestor attributes, wherein the requestor is a user of a connected user device including code segments of a Software Development Kit (SDK) associated with an advertising network;

matching the ad request with an HID in the database; and servicing the ad request using the HID information.

10. A method for servicing ad requests using household identification as recited in claim 9 further comprising servicing the ad request using available information if it was determined that there was not an HID associated with the stored IP address for the requestor in the database.

11. A method for servicing ad requests using household identification as recited in claim 10 wherein developing a database comprises:

(a) retrieving from the database a stored IP address and requestor attributes associated with an advertisement (ad) request of a requestor, wherein the requestor is a user of a connected user device including code segments of a Software Development Kit (SDK) associated with an advertising network;

(b) storing the IP address and requestor attributes of the connected user device that is likely of a residential origin in an IP Bucket by determining that the stored IP address is an IP address of a household WiFi hub; and (c) assigning a household identifier (HID) to the IP Bucket if it qualifies as a household by having at least five connected user devices associated with the stored IP address.

12. A method for servicing ad requests using household identification as recited in claim 11 wherein the IP address and requestor attributes are associated with a connected user device.

13. A method for servicing ad requests using household identification as recited in claim 12 wherein the connected user device is one of a CTV, smartphone, tablet and personal computer (PC).

* * * * *